United States Patent [19]

Parker

[11] Patent Number: 4,506,817

[45] Date of Patent: Mar. 26, 1985

[54] DEVICE FOR OPENING AMPOULES

[76] Inventor: Andrew E. Parker, 6 Winston Gardens, Belfast BT5 6HZ, Northern Ireland

[21] Appl. No.: 451,083

[22] Filed: Dec. 20, 1982

[30] Foreign Application Priority Data

Dec. 23, 1981 [GB] United Kingdom ................. 8138682

[51] Int. Cl.³ .............................................. C03B 33/06

[52] U.S. Cl. .................................. 225/96.5; 30/164.9; 225/93; 241/99

[58] Field of Search ........................... 225/93, 96.5, 96; 30/164.9, 164.95; 241/99

[56] References Cited

U.S. PATENT DOCUMENTS

| | | | |
|---|---|---|---|
| 2,359,644 | 10/1944 | Hoey | 241/99 X |
| 2,977,014 | 3/1961 | Kock | 215/12 |
| 3,720,250 | 3/1973 | Goldberg | 150/52 R |
| 4,226,376 | 10/1980 | Pfleger | 241/99 |
| 4,405,069 | 9/1983 | Vivier et al. | 225/93 |

FOREIGN PATENT DOCUMENTS

| | | | |
|---|---|---|---|
| 420994 | 8/1924 | Fed. Rep. of Germany | 241/99 |
| 1433465 | 2/1966 | France . | |
| 1466082 | 12/1966 | France . | |
| 1572461 | 5/1969 | France . | |
| 2063785 | 9/1971 | France . | |
| 2451742 | 10/1980 | France . | |
| 749091 | 5/1956 | United Kingdom . | |
| 1267318 | 8/1972 | United Kingdom . | |

*Primary Examiner*—Frank T. Yost
*Attorney, Agent, or Firm*—Lane, Aitken & Kananen

[57] ABSTRACT

A device for opening ampoules comprises a hollow cylindrical body, the peripheral wall of which has slits forming two halves which can flex relatively apart or together at an open end of said body to enable entry of an ampoule head portion and for ejection of a broken head portion respectively. The body is dimensioned to accommodate an ampoule head and an inwardly-directed annular bead is provided at the open end against which the neck of an ampoule can be broken. A cutter protrudes from the bead. The bead is provided at the convergence of an outwardly-directed peripheral flange and an inwardly-directed annular ramp. A plunger whose piston is hollow is provided in the body to eject broken ampoule heads.

5 Claims, 5 Drawing Figures

DEVICE FOR OPENING AMPOULES

This invention relates to a device for use in opening ampoules.

Ampoules are small containers each having a hollow cylindrical body portion, a neck portion and a head portion. They are usually of a frangible material, such as glass, but may be of a non-frangible material, such as a plastics material. The ampoules are formed empty with open heads through which an injectable solution is filled to a determined level below the neck portion and the heads are then closed, or alternatively the ampoules are formed with a closed head, which are then broken at the outer end of the head portion, and after the solution is filled thereinto, the heads are then closed. It is necessary to remove the head of a filled ampoule to enable a syringe needle to be inserted into the body portion to take up the solution. Hitherto, the head has been broken off and this is a procedure which may cause injury to the person performing it even if a weakened zone for breaking has been provided in the neck by e.g. cutting a score line thereon or may result in entry into the solution of material particles released by the breaking.

In the instances when a weakened zone or band has been provided at the neck portion during manufacture of ampoules with a view to overcoming these problems, this has reduced the latter problem; however, the problem of possible injury still remains.

An object of the present invention is to obviate or mitigate both problems.

SUMMARY OF THE INVENTION

According to the present invention, a device for opening ampoules comprises an elongate body dimensioned to accommodate an ampoule head and having an open end of circular section whereat is an inwardly-directed annular bead against which the neck of an accommodated ampoule can be broken.

Preferably, the body is of hollow cylindrical form. An outwardly-directed peripheral flange perferably extends from said open end of the body to accommodate the shoulder of the body portion of an ampoule.

Preferably also, a cutter protrudes from the annular bead with a cutting edge or point extending radially inwardly to abut against the neck of an accommodated ampoule.

Preferably further, the peripheral wall of the body is slit along a predetermined length at opposed wall regions thereof whereby on entry of an ampoule head into the body, the parts of the peripheral wall at the open end flex relatively apart to allow entry of a head portion. The slits diverge slightly and uniformly to and through said open end and are centred on a plane longitudinally bisecting the body. A plunger may be located internally of the other end of the body with its rod journalled in a bearing in said other end and extending outwardly therefrom, the plunger being operated manually while the body is held. The piston of the plunger is preferably hollow to accommodate therein the top of an ampoule head. An annular ramp may be provided internally of the annular bead, the ramp conforming substantially and complementarily to the bottom of an ampoule head adjacent to the neck portion whereby on an ejection movement of the plunger, the ramp assists in flexing the parts of the peripheral wall apart on movement therepast by a broken ampoule head portion.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 2:
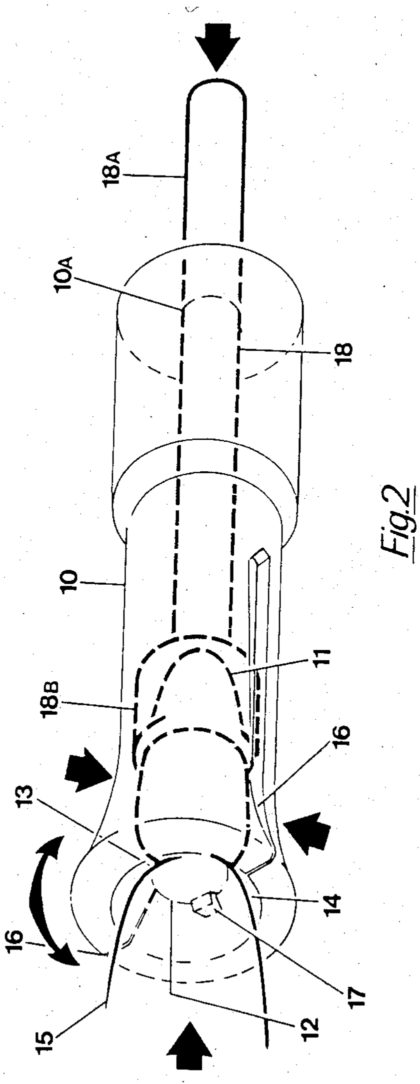
FIG. 2 is a perspective view of the device with the head portion of an ampoule located therein.
Figure 5:
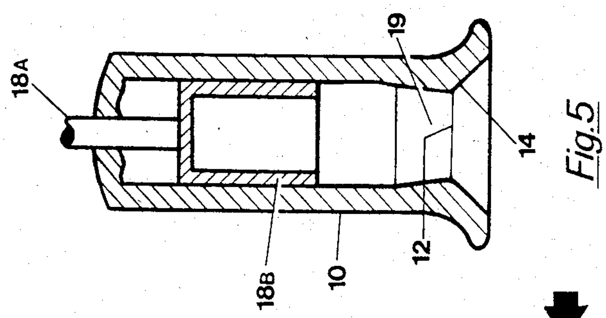
FIG. 5 is a longitudinal section of part of the device.

Referring to the drawings, a device for use in opening ampoules comprises an elongate hollow cylindrical body 10 having one end closed and the other open. The body 10 is dimensioned to accommodate a head portion 11 of an ampoule passed thereinto through its open end, whereat is an inwardly directed peripheral bead 12 against which the neck portion 13 of an accommodated ampoule can be pressed. A peripheral flange 14 extends radially outwardly from the open end of the body 10 to accommodate, as shown in FIG. 2, the shoulder of the body portion 15 of the ampoule. The peripheral wall of the body 10 is slit along a predetermined length from the open end of the body 10, the slits 16 in opposed wall regions diverging slightly uniformly to and through the open end, and two halves of the wall so formed being centred on a diametrical plane of the body 10. The halves of the body 10 separated by the slits 16 can be pressed together or urged apart. A cutter 17 protrudes through the bead 12 with a cutting edge or point extending radially inwardly to abut against the neck portion 13 of an accommodated ampoule.

Figure 3:
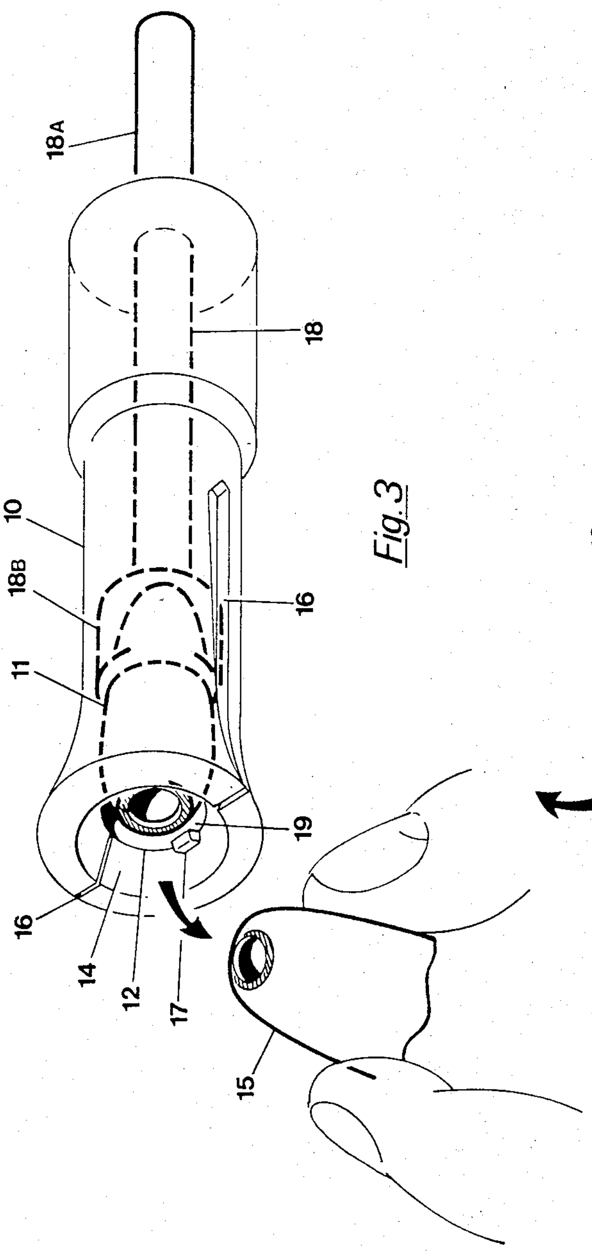
FIG. 3 is a perspective view of the device with the head portion broken from the ampoule body portion.
Figure 4:
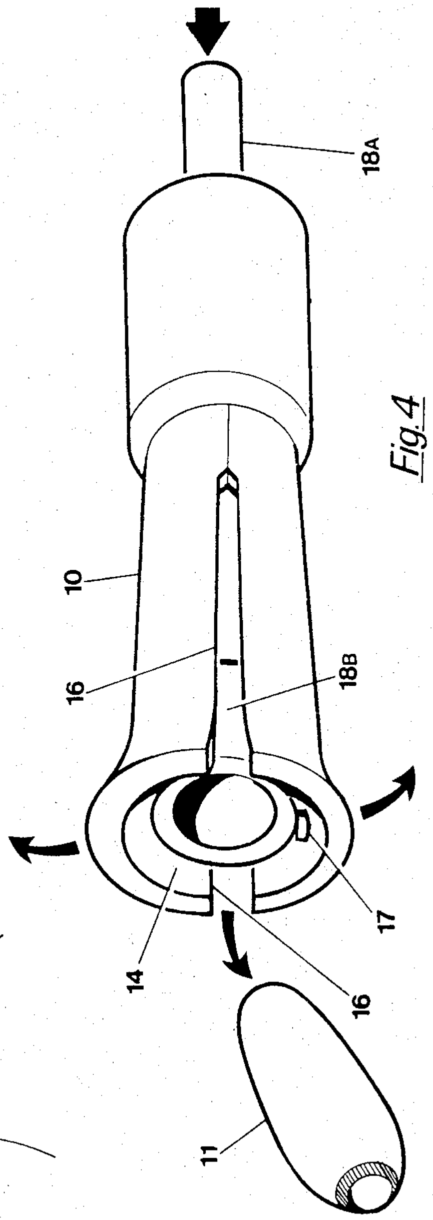
FIG. 4 is a perspective view of the device with the broken head portion being ejected therefrom.

A plunger 18 is located internally of the body 10 at the closed end thereof with its rod 18A journalled in a bearing 10A in the closed end and extending outwardly in a direction away from the body 10. The plunger 18 is operated manually and its piston 18B is hollow to accommodate therein the top of an ampoule head portion 11 as shown in FIGS. 2 and 3. An annular ramp 19 is provided internally of the annual bead 12, the bead 12 being located at the convergence of the flange 14 and ramp 19. The ramp 19 conforms substantially and complementarily to the bottom the head portion whereby on an ejection movement of the plunger towards the open end after an ampoule body portion 15 has been broken away, the aforesaid halves of the body 10 are urged apart by the accommodated ampoule head portion 11 being moved up the ramp 19 thereafter to be ejected from the body 10 and the halves return to their rest position.

Figure 1:
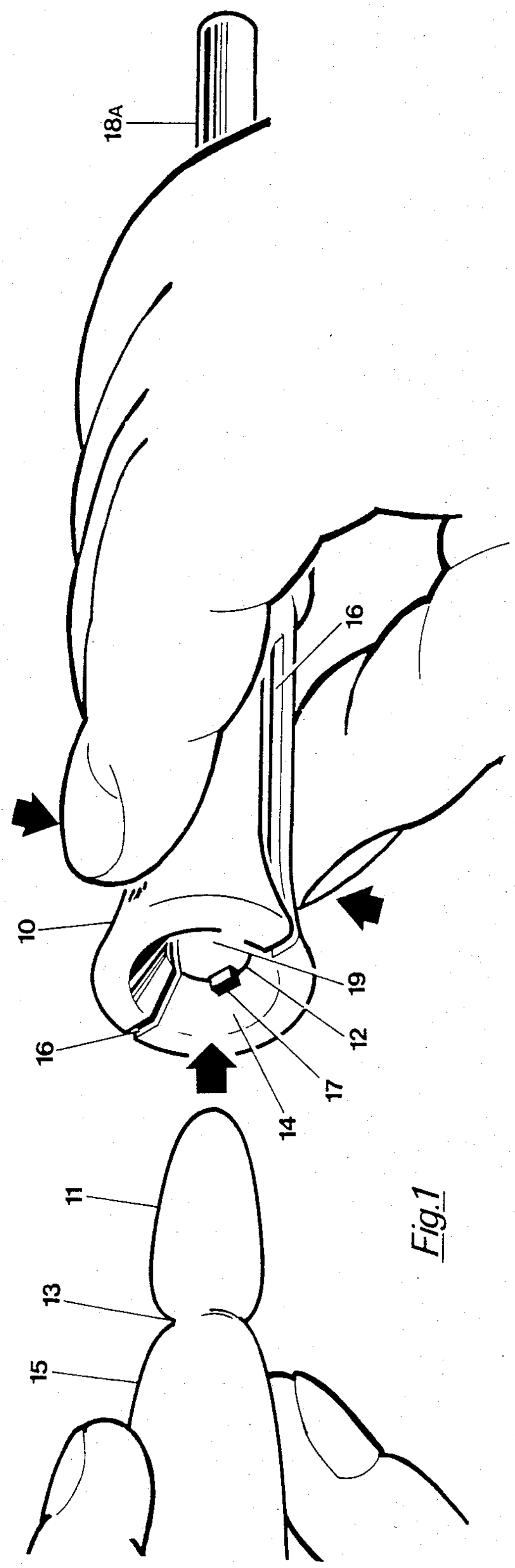
FIG. 1 is a perspective view of a device according to the present invention, showing also an ampoule about to be inserted into the device, the device and ampoule being hand-held.

In use, the device is held disposed at least substantially horizontally on one hand and the head of an ampoule is inserted into the body using the other hand as shown in FIG. 1. By pressing the halves of the body 10 together and rotating the ampoule, a line is scored around the neck portion 13 and, through relative downwards movement of the hands, the head is snapped off at the score line. The flange 14 serves to prevent injury to the hand holding the device. The injectible solution may then be removed from the opened ampoule through a syringe, and the plunger 18 is moved to eject the broken ampoule head portion 11 from the body 10.

The body 10 and plunger 18 are of a heat-resistant, fracture-resistant material, such as stainless steel or a plastics material e.g. polypropylene or nylon.

The device can be sterilised by heating in an autoclave.

Various forms of cutter can be used i.e. in the shape of a pointed metallic pin, a metal disc with cutting edge or such other cutter as scores the required line, and is preferably a premanent cutter of tungston carbide.

The slits may have parallel sides, and it is not necessary to make-complete circular score-line around the neck of the ampoule before breaking. In fact, the ampoule may be broken simply by pressing against the cutter.

I claim:

1. A device for opening ampoules comprising an elongated body dimensioned to accommodate an ampoule head and having an open end of circular section whereat is an inwardly-directed annular bead against which the neck of an accommodated ampoule can be broken, an outwardly directed peripheral flange extending from said open end of the body to accommodate the shoulder of the body portion of an ampoule, a cutter protruding from said annular bead with a cutting portion extending radially inwardly to abut against the neck of an accommodated ampoule, a plunger being located internally of the other end of the body with its rod journalled in a bearing in said other end and extending outwardly therefrom, the plunger being operated manually while the body is held, wherein a wall of the body is elongately slit along a predetermined length at opposed wall regions thereof to enable parts of a peripheral wall at the open end to flex relatively apart to allow entry of a head portion of an ampoule.

2. The device according to claim 1, wherein the piston of the plunger is hollow to accommodate therein the top of an ampoule head.

3. The device according to claim 1, wherein an annular ramp is provided internally of the annular bead, the ramp conforming substantially and complementarily to the bottom of an ampoule head adjacent to the neck portion, the ramp on an ejection movement of the plunger, assists in flexing the parts of the peripheral wall apart on movement therepast by a broken ampoule head portion.

4. The device according to claim 1, wherein the slits diverge slightly and uniformly to and through said open end and are centred on a plane longitudinally bisecting the body.

5. A device for opening ampoules comprising an elongated body of a hollow cylindrical form, defining a peripheral wall, dimensioned to accommodate an ampoule end, and having an open end of circular cross section whereat is located an inwardly-directed annular bead against which the neck of an accommodated ampoule can be broken, wherein the peripheral wall of the body is slit along a predetermined length at opposed wall regions thereof to enable the parts of the peripheral wall at the open end to flex relatively apart to allow entry of a head portion of an ampoule; and an annular ramp provided internally of the annular bead, the ramp conforming substantially and complementarily to the bottom of an ampoule head adjacent to the neck portion, the ramp assisting in flexing the parts of the peripheral wall apart on movement therepast by a broken ampoule head portion.

* * * * *